(12) United States Patent
Meinherz

(10) Patent No.: US 7,692,113 B2
(45) Date of Patent: Apr. 6, 2010

(54) SWITCH ASSEMBLY

(75) Inventor: Manfred Meinherz, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 590 days.

(21) Appl. No.: 10/558,747

(22) PCT Filed: May 3, 2004

(86) PCT No.: PCT/DE2004/000982

§ 371 (c)(1),
(2), (4) Date: Dec. 1, 2005

(87) PCT Pub. No.: WO2004/109880

PCT Pub. Date: Dec. 16, 2004

(65) Prior Publication Data

US 2007/0017904 A1   Jan. 25, 2007

(30) Foreign Application Priority Data

Jun. 2, 2003   (DE) ................. 103 25 681

(51) Int. Cl.
   *H01H 33/02*   (2006.01)
(52) U.S. Cl. .......................... 218/43; 218/80
(58) Field of Classification Search .......... 218/2, 218/3, 7, 11–14, 43–45, 67–70, 78–80, 152–155
   See application file for complete search history.

(56) References Cited

U.S. PATENT DOCUMENTS

| 4,434,334 | A | 2/1984 | Tragesser |
| 6,444,937 | B1 * | 9/2002 | Piazza ........................ 218/68 |
| 6,459,568 | B2 | 10/2002 | Matsushita et al. |
| 6,538,224 | B2 | 3/2003 | Furuta et al. |
| 6,545,241 | B1 * | 4/2003 | Franchi et al. ................ 218/78 |
| 6,573,469 | B1 * | 6/2003 | Piazza ........................... 218/7 |
| 6,743,999 | B2 * | 6/2004 | Muraki et al. .................. 218/2 |
| 7,053,326 | B2 * | 5/2006 | Muraki et al. .................. 218/2 |
| 2002/0012225 | A1 | 1/2002 | Matsushita et al. |
| 2002/0056704 | A1 * | 5/2002 | Furuta et al. ................. 218/13 |

FOREIGN PATENT DOCUMENTS

DE   101 19 530 A1   11/2002

\* cited by examiner

*Primary Examiner*—Renee S Luebke
*Assistant Examiner*—Marina Fishman
(74) *Attorney, Agent, or Firm*—Laurence A. Greenberg; Werner H. Stemer; Ralph E. Locher

(57) ABSTRACT

The invention relates to a switch assembly comprising an essentially tubular enclosed housing. The tubular axis of the enclosed housing deviates from the horizontal and the vertical. The switch assembly comprises an interrupter unit, to which three main leads are connected.

13 Claims, 3 Drawing Sheets

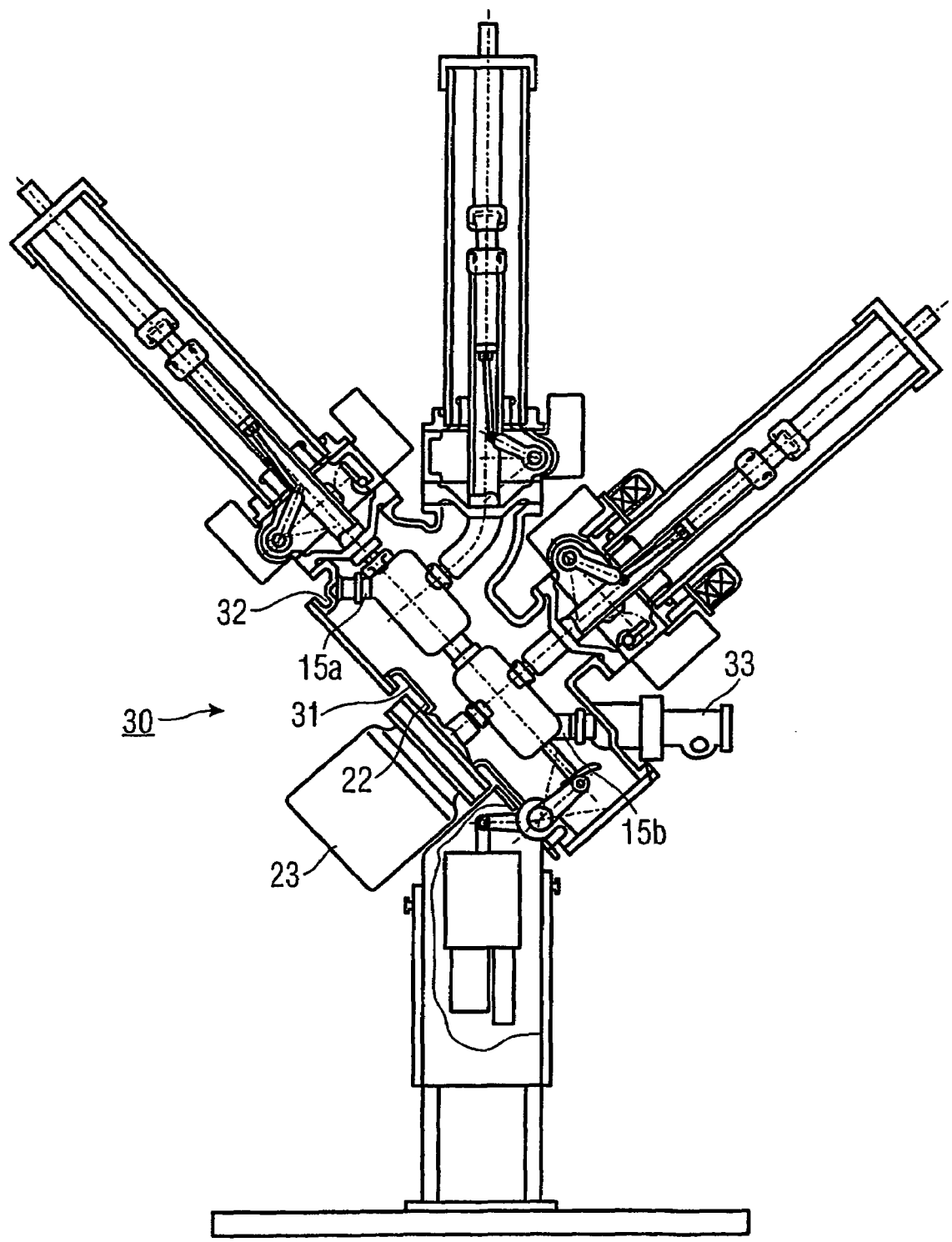

SWITCH ASSEMBLY

CLAIM FOR PRIORITY

This application is a national stage of PCT/DE2004/000982 which was published on Dec. 16, 2004 and which claims the benefit of priority to German Application No. 103 25 681.4 filed Jun. 2, 2003.

TECHNICAL FIELD OF THE INVENTION

The invention relates to a switch arrangement having an interrupter unit which is arranged within an essentially tubular encapsulation enclosure, with the interrupter unit having a main current path with a first and a second end, between which a switching gap of the interrupter unit is arranged, and a first output line is passed out of the end face of the encapsulation enclosure and a second output line is passed out of the casing of the encapsulation enclosure, and the interrupter unit has a third associated output line.

BACKGROUND OF THE INVENTION

Gas-insulated hybrid switching devices are known from the patent specifications U.S. Pat. No. 6,538,224 B2 and U.S. Pat. No. 6,459,568 B2. The hybrid switching devices there each have combinations of interrupter units for a circuit breaker, as well as one or more switch disconnectors.

Furthermore, U.S. Pat. No. 4,434,334 discloses a circuit breaker whose interrupter units are arranged in enclosures, which are each at ground potential. Outdoor bushings are flange-connected to the enclosure in order to pass the electrical connecting conductors through to the interrupter units. The enclosures are in an inclined position, in the installed state.

A further switch arrangement is disclosed, for example, in Laid-Open Specification DE 101 19 530 A1. In the known arrangement, an interrupter unit is arranged with its main current path within an encapsulation enclosure.

A module having a switch disconnector and a grounding switch, and on which bushings are arranged, is arranged at the end. The encapsulation enclosure is essentially tubular. The tube axis of the tubular encapsulation enclosure is arranged horizontally. Further modules are flange-connected to the casing of the encapsulation enclosure, and busbars are arranged in them.

A switch arrangement such as this requires a large number of further modules, in addition to the encapsulation enclosure. Furthermore, the known switch arrangement requires a large installation area.

SUMMARY OF THE INVENTION

The invention is based on the object of refining a switch arrangement of the type mentioned initially such that the switch arrangement costs little and requires only a small installation area.

According to the invention, this is achieved in that the tube axis of the essentially tubular encapsulation enclosure when the switch arrangement is in the ready-to-operate state is not vertical or horizontal, the first and the second output lines are electrically conductively connected to the first end of the main current path, and the third output line is electrically conductively connected to the second end of the main current path.

The oblique arrangement of the tube axis allows the switch arrangement to be installed on a small base area. The encapsulation enclosure is mounted on a supporting frame, which supports the encapsulation enclosure at one end. This alignment provides the entire switch arrangement with an upright contour, oriented with a vertical. The electrical connection of two output lines to the same end of the main current path allows a line to be connected to be split between two outgoers. A switch arrangement such as this can be used, for example, in a high-voltage switchgear assembly. In this case, the switch arrangement may have one or more encapsulated poles, with the encapsulation enclosure being filled with insulating gas at a raised pressure.

A further advantageous refinement provides for the third output line to be passed out of the casing of the encapsulation enclosure.

When the second output line and the third output line are arranged in the casing area of the encapsulation enclosure, the first and the second end of the main current path can have electrical contact made with them on the casing side. The encapsulation enclosure can thus also be used to form a conventional dead-tank high-voltage circuit breaker with a horizontally arranged interrupter unit. The encapsulation enclosure can thus be used in a versatile manner.

It is advantageously also possible to provide for at least one of the output lines to have an associated switch disconnector.

Association between the switch disconnectors allows the switch arrangement to be used in switchgear assemblies in which separate switch disconnectors and separate circuit breakers have been used until now. Particularly when in each case one switch disconnector is associated with each output line, the circuit arrangement allows a wide range of circuit variants to be produced. Display means may be provided in order to indicate the position of the switch disconnectors.

It is also advantageously possible to provide for at least one of the first or of the second output lines to have a grounding switch, and for the third output line to have a grounding switch.

The interrupter unit can be grounded by means of the grounding switches. In this case, the two ends of the interrupter unit can be grounded separately via the associated grounding switches. In a corresponding circuit variant, the overhead lines, busbars, cables etc which are connected to the output lines can likewise be grounded via the grounding switches.

A further refinement can provide for at least one of the output lines to be in the form of an outdoor bushing, or for the first, the second and the third output lines to be in the form of outdoor bushings.

Outdoor bushings are a cost-effective way to pass the output lines through the encapsulation enclosure in a gas-tight manner. Electrical lines can be connected directly to outdoor bushings. A switch arrangement having an interrupter unit, switch disconnectors and grounding switches can be used as a switchboard in a switchgear assembly. Compact switch arrangements such as these are also suitable, for example, for replacing switchboards which were previously formed in outdoor insulation.

It is also advantageously possible to provide for the switch disconnector or disconnectors to be integrated in the outdoor bushing or bushings.

Integration of the switch disconnectors in the outdoor bushing results in an insignificant increase in the physical volume of conventional outdoor bushings. Volumes which until now have been used to control the voltage distribution can be used, for example, in order to accommodate drive elements or movable elements.

Furthermore, it is advantageously possible to provide for one of the outdoor bushings to be arranged vertically and for two further outdoor bushings to be arranged in the form of a fan, symmetrically with respect to the vertical outdoor bushing.

This arrangement of the bushings allows the mass to be distributed approximately uniformly on the switch arrangement. It is thus possible to arrange the mounting frame for holding the switch arrangement on a small base area, a foundation or the like.

A further advantageous refinement makes it possible to provide for the longitudinal axis of an outdoor bushing which is arranged on the casing side to be arranged radially with respect to the tube axis of the encapsulation enclosure, and the longitudinal axis of another outdoor bushing which is arranged on the casing side to be arranged obliquely, at an angle to a radial of the tube axis.

The output lines are passed through the encapsulation enclosure in an insulated form by means of the outdoor bushings. The output lines extend along the longitudinal axes of the outdoor bushings.

It is advantageously also possible to provide for isolators for holding the interrupter unit to be arranged at the side on the interrupter unit.

By way of example, the isolators may be in the form of post insulators, in the form of columns. The longitudinal axes of post insulators such as these which are in the form of columns are preferably located radially with respect to the tube axis of the encapsulation enclosure. If required, they could however also be arranged at an angle to this tube axis.

BRIEF DESCRIPTION OF THE DRAWINGS

Exemplary embodiments of the invention will be described in the following text and are illustrated schematically in the figures, in which:

FIG. 3 shows a third refinement variant of a switch arrangement.

DETAILED DESCRIPTION OF THE INVENTION

The refinement variants illustrated in the figures have fundamentally very similar designs. They differ in individual details. The apparatuses which have the same effect and are illustrated in the various figures are provided with the same reference symbols.

Figure 1:
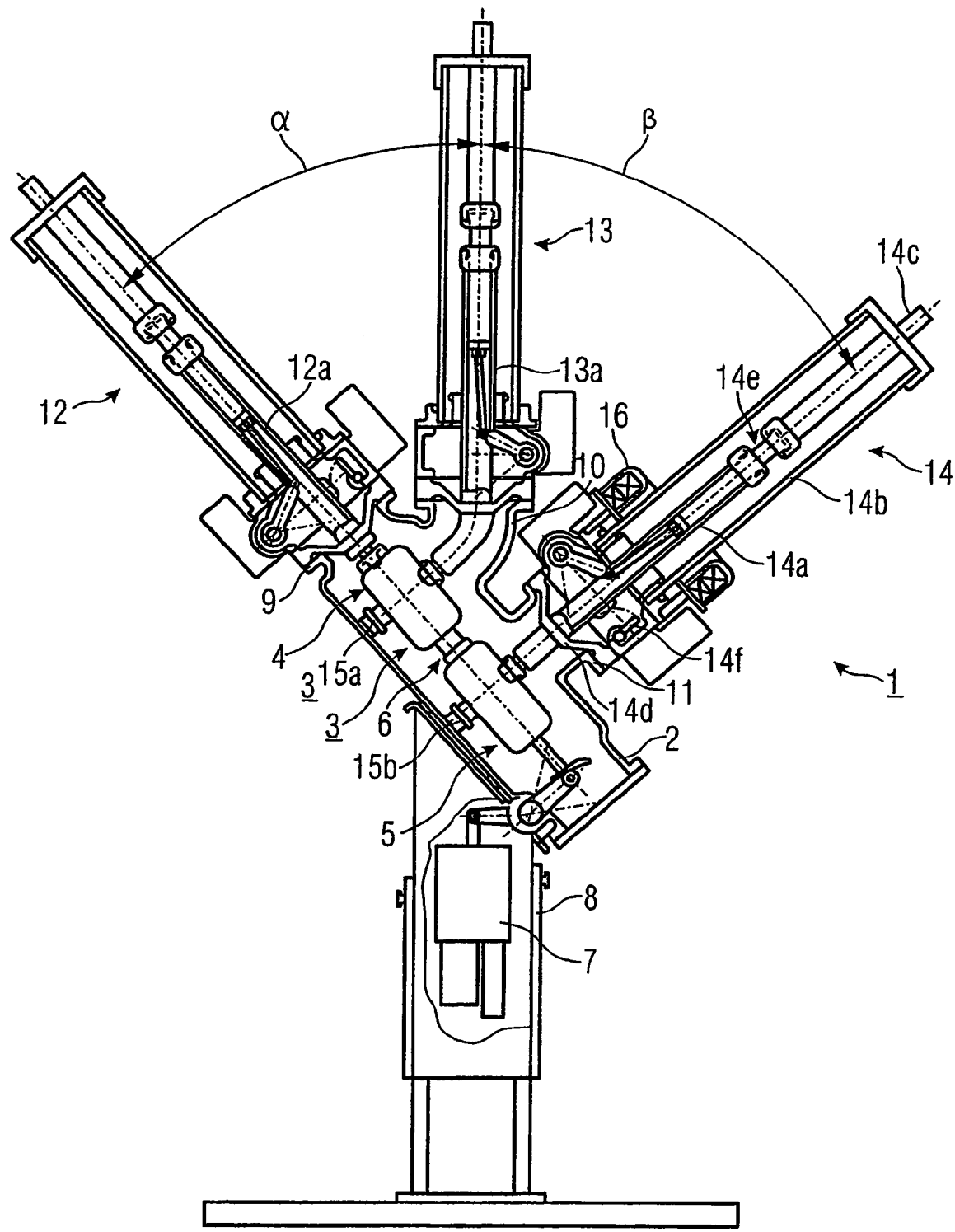
FIG. 1 shows a first refinement variant of a switch arrangement.

FIG. 1 shows a first refinement variant of a switch arrangement 1. The first refinement variant of the switch arrangement 1 has an essentially tubular encapsulation enclosure 2. An interrupter unit 3 is arranged along the tube axis of the encapsulation enclosure 2, in its interior. The interrupter unit 3 has a first end 4 and a second end 5 of a main current path. A switching gap 6 of the interrupter unit 3 is arranged between the first and the second end 4, 5 of the interrupter unit 3.

The main current path can be interrupted by means of the switching gap 6. The interrupter unit 3 is an interrupter unit of a high-voltage circuit breaker. The interior of the encapsulation enclosure 2 is filled with an insulating gas at a raised pressure. The switching gap 6 has two contact pieces which can be moved relative to one another, at least one of which can be moved by means of a drive device 7. The drive device 7 is held by a mounting frame 8. The movement which is produced by the drive device 7 is transmitted via a kinematic chain through a wall of the encapsulation enclosure 2 into its interior. The mounting frame 8 has an equipment cabinet in whose interior further control and monitoring devices, in addition to the drive device 7, can also be accommodated.

The mounting frame 8 is also fitted with the encapsulation enclosure 2, with the fittings that are fitted to it. The tube axis of the encapsulation enclosure 2 is neither horizontal nor vertical when the switch arrangement is in the operating position. The tube axis is located at an angle of about 45 degrees to the horizontal. Depending on the installation location of the switch arrangement, the position may differ by up to plus or minus 20 degrees in this case.

The encapsulation enclosure 2 has a first connecting flange 9 at the end. A second and a third connecting flange 10, 11 are arranged on the casing. A first outdoor bushing 12 with a first output line 12a is arranged on the first connecting flange 9. A second outdoor bushing 13 with a second output line 13a is arranged on the second connecting flange 10. A third outdoor bushing 14 with a third output line 14a is flange-connected to the third connecting flange 11. The first and the second output lines 12a, 13a are connected to the first end 4 of the interrupter unit 3. The third output line 14a is electrically conductively connected to the second end 5 of the interrupter unit. The outdoor bushings 12, 13, 14 are used to pass the electrical conductors through the encapsulation enclosure 2 (which, for example, is a metallic body and is at ground potential) in an insulated manner. The outdoor bushings 12, 13, 14 project essentially upright from the mounting frame 8. The interrupter unit 3 is arranged such that it is electrically isolated from the encapsulation enclosure 2. Post insulators 15a, b are arranged between the encapsulation enclosure 2 and the interrupter unit 3 for this purpose. Depending on the form of the encapsulation enclosure 2 and of the interrupter unit 3, the installation locations of the post insulators 15a, b may be shifted along the interrupter unit 3 (see FIGS. 2 and 3).

The second connecting flange 10 is fitted in the form of a knee to the casing of the encapsulation enclosure 2. Alternatively, it is also possible to provide for an adaptor in the form of a knee to be placed on a flange which is arranged on the casing. The bend of the knee is chosen such that the second outdoor bushing 13, which is flange-connected to the second connecting flange 10, is aligned approximately vertically. When the switch arrangement 2 is in the installed state, the angles $\alpha$, $\beta$ which are included between the longitudinal axes of the second outdoor bushing 13 and the first outdoor bushing 12, as well as between the longitudinal axes of the second outdoor bushing 13 and of the third outdoor bushing 14, are approximately the same.

The design of the third outdoor bushing 14 will now be described, by way of example. The outdoor bushing 14 has an insulating enclosure 14b. A connecting bolt 14c is arranged at the free end of the third outdoor bushing 14. A bulkhead isolator 14d is arranged at the footpoint of the outdoor bushing. The third output line 14a is held isolated in the interior of the third outdoor bushing. The disconnection point of a switch disconnector 14e is integrated in the conductor run of the third output line 14a. In addition, the third outdoor bushing 14 has a grounding switch 14f. The second end 5 of the interrupter unit 3 can be disconnected from an electrical conductor that makes contact with the connecting bolt 14c by means of the switch disconnector 14e, and can be grounded via the grounding switch 14f. When the switch disconnector 14f is closed, an electrical conductor which makes contact with the connecting bolt 14c can also be grounded.

The third outdoor bushing 14 has an associated current transformer 16, by means of which the electric current flowing through the third output line can be measured.

The first outdoor bushing 12 has an identical design to that of the third outdoor bushing 14. The second outdoor bushing 13 is of a simpler design. Since its output line makes electrical contact with the same end of the interrupter unit 3, as the output line from the first outdoor bushing 12, there is no need for either a grounding switch or a current transformer. However, if required, the second outdoor bushing 13 can also be equipped with this.

By way of example, a switch arrangement such as this allows a supply line to be connected to two busbars via the third outdoor bushing 14 and via the first and the second outdoor bushings 12, 13. Connection to the supply line is made via the interrupter unit 3. Distribution to the respective busbars takes place via the switch disconnectors of the first and of the second outdoor bushings 12, 13.

Furthermore, busbar changes can be carried out, and busbar sections, the interrupter unit 3 together with the connected output lines or else the supply line can be grounded via the grounding switches.

Figure 2:
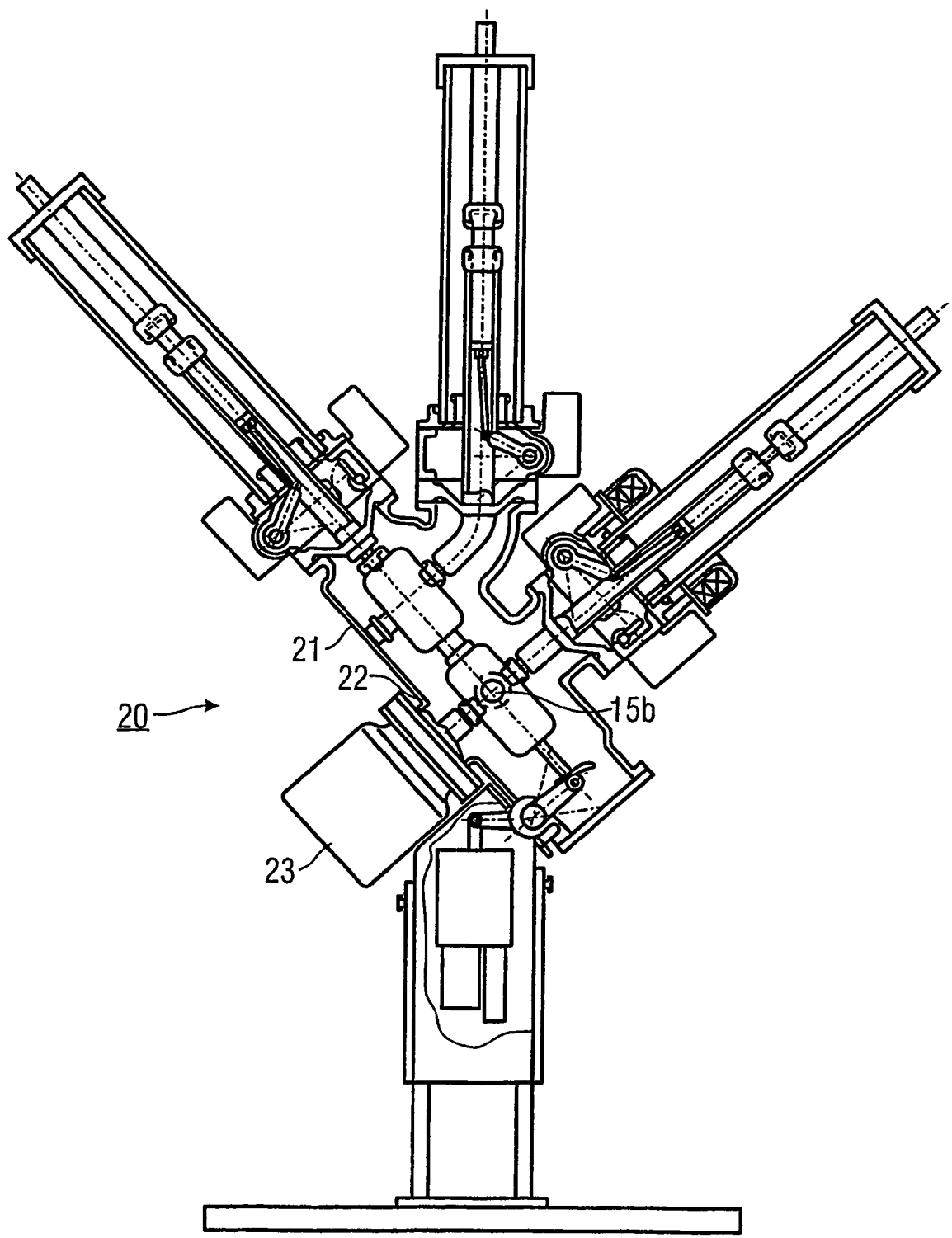
FIG. 2 shows a second refinement variant of a switch arrangement.

The second refinement variant, as illustrated in FIG. 2, of a switch arrangement 20 is fundamentally of the same design as the first refinement variant 1. The encapsulation enclosure 21 additionally has a fourth connecting flange 22 on the casing side. A voltage transformer 23 is flange-connected to the fourth connecting flange, for voltage measurement. The position of the post insulator 15b is varied by means of the fourth connecting flange 22.

The third refinement variant 30, which is illustrated in FIG. 3, is in principle of the same design as the first and the second refinement variants 1, 20. The encapsulation enclosure 31 of the third refinement variant 30 has a fifth connecting flange 32 on the casing side. The interior of the encapsulation enclosure 31 is accessible for installation purposes through this connecting flange. Furthermore, a further grounding switch 33 is arranged on the encapsulation enclosure 31. The further grounding switch 33 can be operated in situ, for example during maintenance work, and grounds the interrupter unit. The position of the post insulators 15a, b is matched to the shape of the encapsulation enclosure 31.

The details of the various refinement variants can be combined with one another so that it is also possible to produce refinements which are not illustrated in the figures. Furthermore, the invention is not restricted to the single-pole encapsulation illustrated in the figures. Embodiments may also provide for electrical conductors of a plurality of phases to be arranged within a common enclosure. In this case, by way of example, the outdoor bushings can be arranged such that they project on a plurality of planes, in the form of rays, from the encapsulation enclosure.

What is claimed is:

1. A switch arrangement, comprising:
   an interrupter unit disposed within a substantially tubular encapsulation enclosure, said tubular encapsulation enclosure having a casing, an end face and a tube axis inclined relative to vertical and relative to horizontal when the switch arrangement is in a ready-to-operate state, said interrupter unit having a main current path with a first end and a second end and a switching gap formed between said first end and said second end, said interrupter unit having a first output line passing out of said end face of said encapsulation enclosure and a second output line passing out of said casing of said encapsulation enclosure, said first and second output lines being electrically conductively connected to said first end of said main current path, said interrupter unit having a third output line being electrically conductively connected to said second end of said main current path.

2. The switch arrangement according to claim 1, wherein said third output line is passed out of said casing of said encapsulation enclosure.

3. The switch arrangement according to claim 1, wherein at least one of said output lines has an associated switch disconnector.

4. The switch arrangement according to claim 3, wherein said at least one of said output lines is an outdoor bushing.

5. The switch arrangement according to claim 4, wherein said switch disconnector is integrated in said outdoor bushing.

6. The switch arrangement according to claim 1, wherein each said output line has an associated switch disconnector.

7. The switch arrangement according to claim 6, wherein at least one of said output lines is an outdoor bushing.

8. The switch arrangement according to claim 7, wherein the first, the second and the third output lines are outdoor bushings.

9. The switch arrangement according to claim 8, wherein a longitudinal axis of one of said outdoor bushings disposed on said casing is provided radially with respect to said tube axis of said encapsulation enclosure and a longitudinal axis of another of said outdoor bushings disposed on said casing is arranged obliquely, at an angle to a radial of said tube axis.

10. The switch arrangement according to claim 8, wherein said switch disconnectors are integrated in said outdoor bushings.

11. The switch arrangement according to claim 10, wherein one of said outdoor bushings is disposed vertically and two remaining said outdoor bushings are disposed in the form of a fan, symmetrically with respect to said vertically disposed outdoor bushing.

12. The switch arrangement according to claim 1, wherein at least one of said first line and second output line has a grounding switch, and said third output line has a grounding switch.

13. The switch arrangement according to claim 1, further comprising isolators disposed on a side of said interrupter unit for holding said interrupter unit.

* * * * *